United States Patent [19]

Yamaguchi et al.

[11] Patent Number: 4,797,991
[45] Date of Patent: Jan. 17, 1989

[54] VERTICAL MACHINING CENTER

[75] Inventors: Yoshinori Yamaguchi, Sakuraishi; Soichi Nishiyama, Nagagun; Norihide Maeda, Kashiwarashi; Masayasu Miyoshi, Yamatokoriyamashi, all of Japan

[73] Assignee: Kabushiki Kaisha Mori Seiki Seisakusho, Nara, Japan

[21] Appl. No.: 104,270

[22] Filed: Oct. 5, 1987

[30] Foreign Application Priority Data

Oct. 24, 1986 [JP] Japan ............................ 61-254298

[51] Int. Cl.⁴ .................... B23Q 3/156; B23C 1/14
[52] U.S. Cl. .............................. 29/568; 198/346.1; 409/219
[58] Field of Search ............ 29/563, 33 P, 568; 198/339.1, 345, 346.2, 805.2, 346.1; 409/189, 190, 197, 198, 219

[56] References Cited

U.S. PATENT DOCUMENTS

| | | | |
|---|---|---|---|
| 3,931,882 | 1/1976 | Ossbahr | 198/803.2 |
| 4,075,753 | 2/1978 | Gusching et al. | 29/568 |
| 4,090,287 | 5/1978 | Selander | 29/568 |
| 4,133,423 | 1/1979 | Zankl | 29/563 X |
| 4,512,068 | 4/1985 | Piotrowski | 29/33 P |
| 4,603,456 | 8/1986 | Hiroyasu et al. | 29/563 X |
| 4,679,286 | 7/1987 | Momoi et al. | 29/33 P |

FOREIGN PATENT DOCUMENTS

| | | | |
|---|---|---|---|
| 134161 | 10/1981 | Japan | 29/33 P |
| 1131 | 1/1984 | Japan | 198/346.1 |
| 1202363 | 8/1970 | United Kingdom | 29/33 P |

Primary Examiner—William R. Briggs
Attorney, Agent, or Firm—Antonelli, Terry & Wands

[57] ABSTRACT

A vertical machining center, which comprises a pallet clamp unit and a pallet conveyor unit arranged along the front face of the bed. A saddle is provided on the upper surface of the bed, with the saddle being slidable along the X axis. A column is provided on the top surface of the saddle, with the column being slidable along the Y axis. A headstock is provided on the front face of the column, with the headstock being vertically slidable. A tool magazine and an automatic tool exchange device are both arranged alongside the bed, and a numerical control unit is provided for numerically controlling the saddle, the column, the headstock, the pallet clamp unit, the pallet conveyor, the tool magazine and the automatic tool exchange device.

4 Claims, 9 Drawing Sheets

VERTICAL MACHINING CENTER

BACKGROUND OF THE INVENTION

1. Field of the Invention

The present invention relates to a vertical machining center adapted for use in the production mechanical components, and more particularly to a vertical machining center for incorporation in the versatile system intended for the production of a variety of components in small quantity.

2. Description of the Prior Art

It is generally known that the machining center is the most important in the numerical control (NC) machine tools. However, the conventional machining centers are generally large, thereby occupying a large space. As a matter of course the large size reflects in the price. When several machining centers are systematized into a production line the site allows of no room for the conveyors of appropriate size. The conveyors of limited sizes have a limited performance. After all to achieve the full automatic versatile system in an unmanned factory a large space must be prepared for accommodating the large-sized system. In the light of the recent high prices of land a large investment will be required, which is nowadays a bottleneck to the development of versatile manufacturing systems.

OBJECTS AND SUMMARY OF THE INVENTION

The present invention aims at solving the problems pointed out above, and has for its object to provide a vertical machining center of compact size and simplified structure, and capable of economic fabrication without sacrificing efficiency.

In accordance with the present invention, a vertical machining center is provided which includes a pallet clamp unit and a pallet conveyor unit arranged along the front face of the bed. A saddle is provided on the upper surface of the bed, with the saddle being slidable along the X axis. A column is provided on the top surface of the saddle, with the column being slidable along the Y axis, and a headstock provided on the front face of the column, with the headstock being vertically slidable. A tool magazine and an automatic tool exchange device, are both arranged alongside the bed, with a numerical control unit for numerically controlling the saddle, the column, the headstock, the pallet clamp unit, the pallet conveyor, the tool magazine and the automatic tool exchange device.

The above and other objects, features, and advantges of the present invention will become more apparent from the following detailed description, when taken in connection with the accompanying drawings which show, for the purpose of illustration only, two embodiments in accordance with the present invention.

BRIEF DESCRIPTION OF THE DRAWINGS

FIGS. 9($a$) to ($c$) are explanatory views showing an example of the automatic line including the machining center of the present invention.

DETAILED DESCRIPTION OF THE INVENTION

Figure 1:
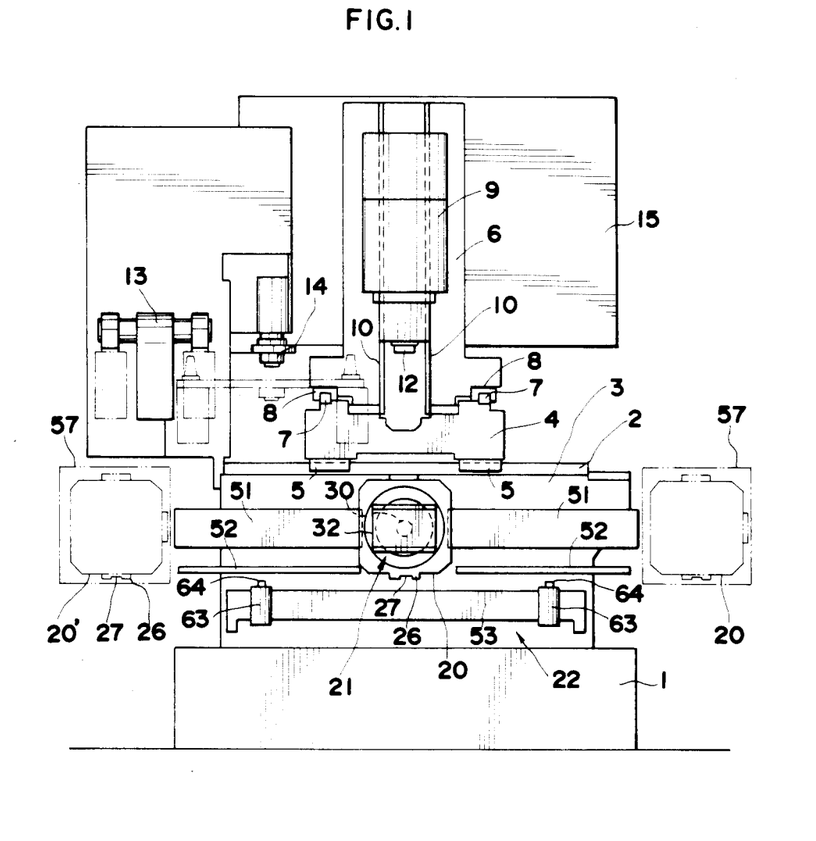
FIG. 1 is a front view showing a vertical machining center embodying the present invention.
Figure 2:
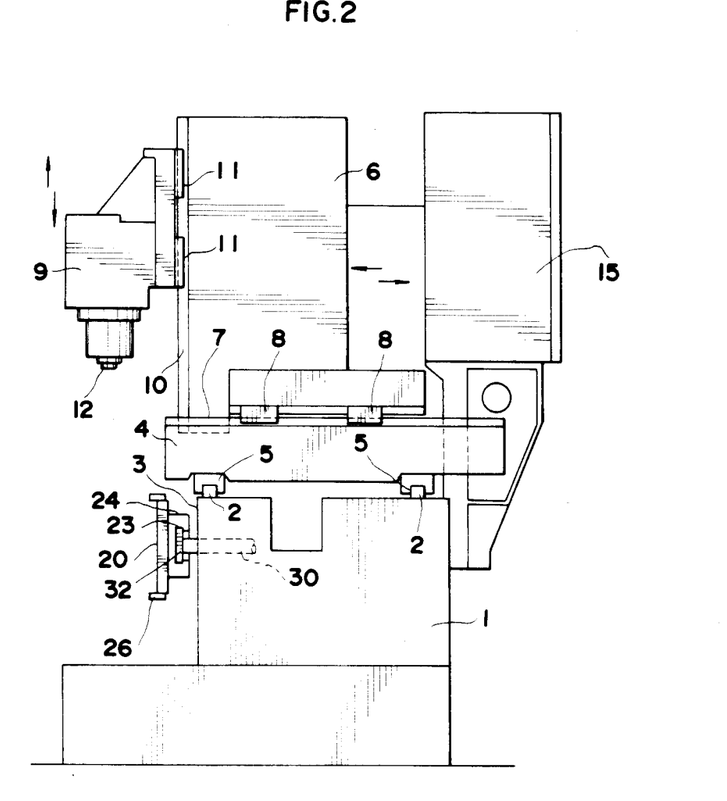
FIG. 2 is a right-hand side view showing the machining center of FIG. 1.

Referring now to the drawings wherein like reference numerals are used throughout the various views to designate like parts and, more particularly, the FIG. 1, according to this figure, a vertical machining center includes a bed 1, which is provided with a horizontal linear guide 2. The linear guide 2 includes a clamp unit 21 for a pallet 20 and a pallet conveyor 22. A saddle 4 is movably joined to the linear guide 2 through a bearing 5. The saddle 4 is caused to move along the X axis, that is, to the right and left in FIG. 1. A column 6 is movably joined to a second linear guide 7 provided on the saddle 4 through a bearing 8. The column 6 is movable along the Y axis, that is, perpendicularly to the plane of the drawing. The column 6 is provided with a headstock 9 which is movable along the Z axis, that is, upward and downward in FIG. 2. There are provided bearings 11 slidable along a third linear guide 10. The headstock 9 incorporates an electric motor (not shown), and a main shaft 12 directly connected to the motor shaft without the use of any intermediate means, such as a belt or gears. The saddle 4, the column 6 and the headstock 9 are operated independently of each other in the known manner, e.g. by the use of a servomotor.

The bed 1 is provided with a tool magazine 13, and an automatic tool exchange device 14 of a known system, such as a twin-arm system. The machine incorporates an NC (numerical control) device 15, which controls the saddle 4, the column 6, the headstock 9, the tool magazine 13, the tool exchange device 14, the pallet clamp unit 21 and the pallet conveyor 22.

Figure 3:
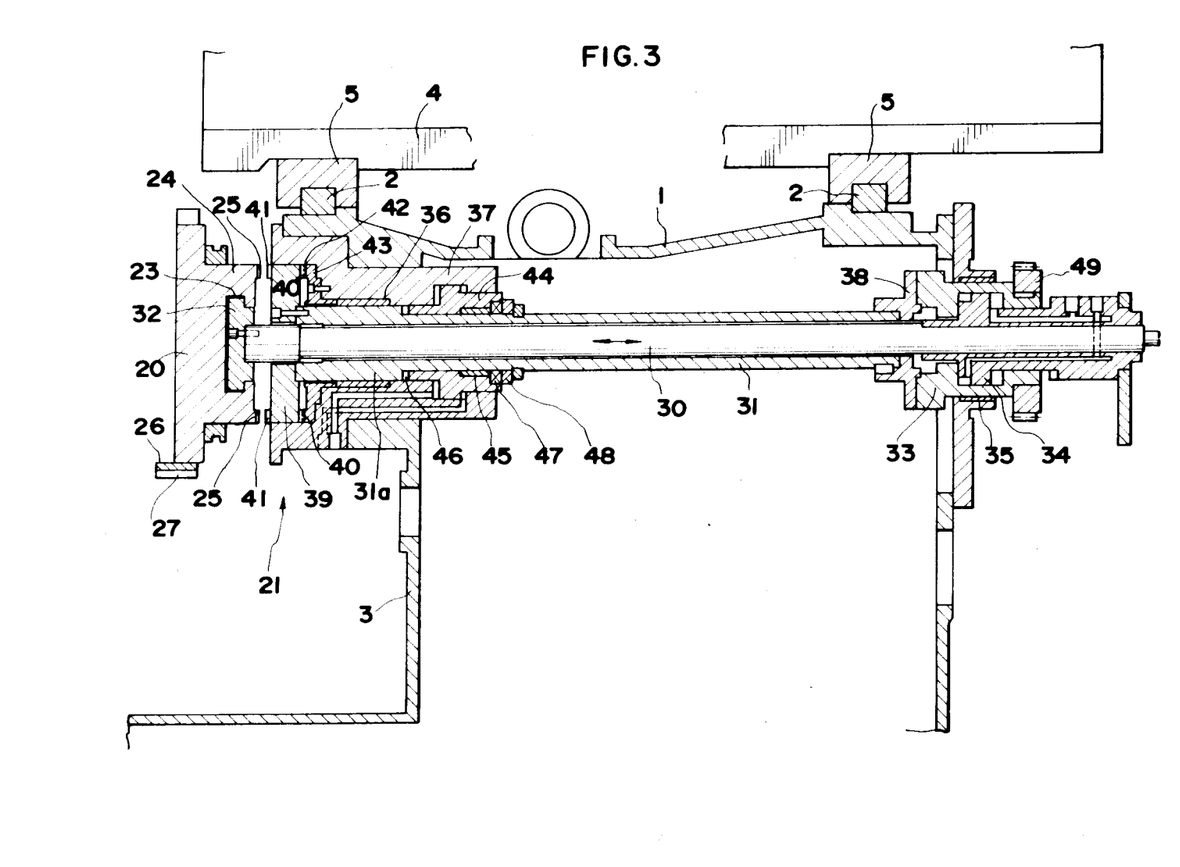
FIG. 3 is a side view showing a part of the pallet clamp unit included in the machining center.
Figure 4:
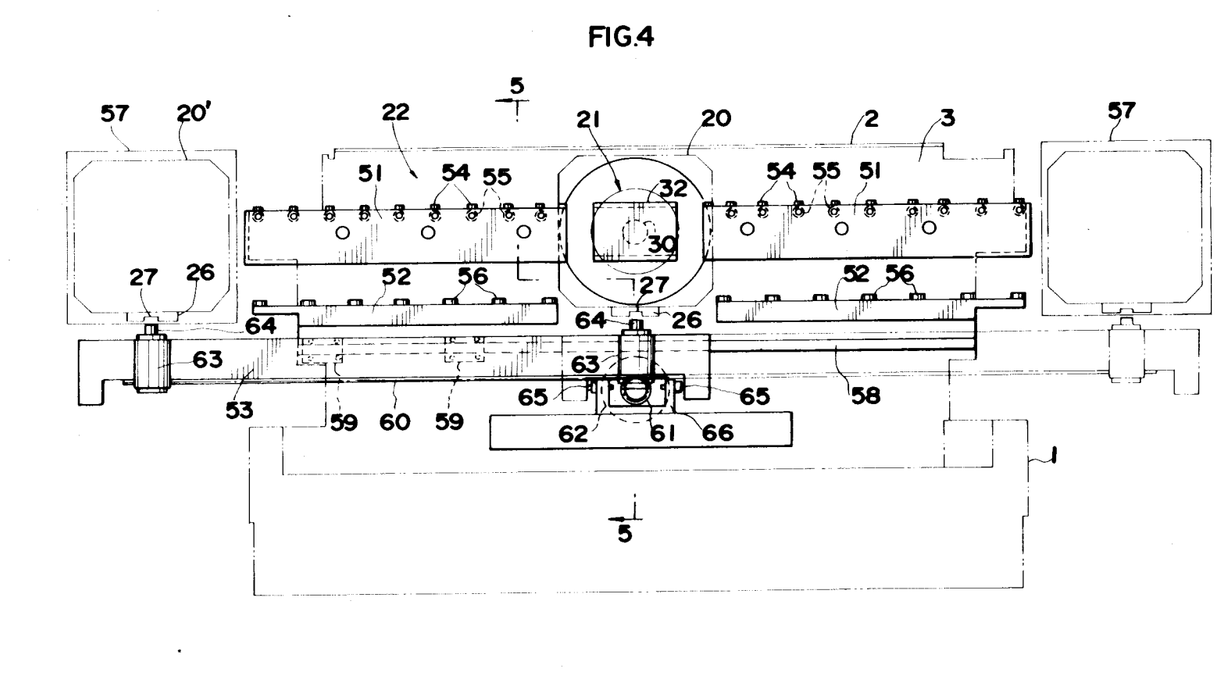
FIG. 4 is a front view of the pallet conveyor unit.
Figure 5:
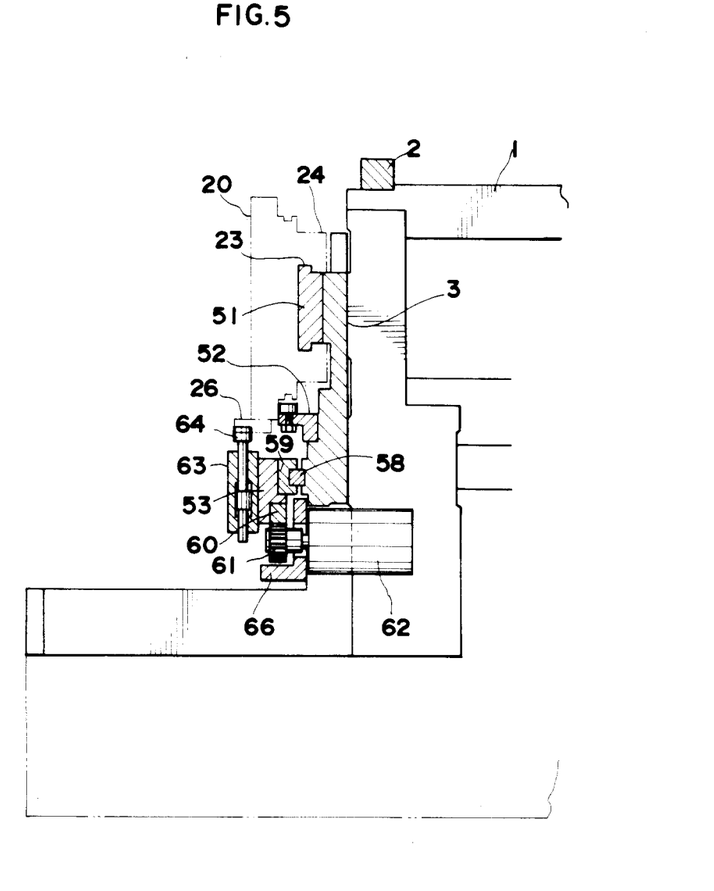
FIG. 5 is a cross-sectional view taken along the line 5—5 in FIG. 4.

Referring to FIGS. 3 to 5 the pallet clamp unit 21 and conveyor 22 will be described in greater detail:

The pallet 20 has a square shape having each corner cut, and is provided with a groove 23 in its back as best shown in FIG. 3, wherein the reference numeral 24 denotes a shoulder thereof having coupling teeth 25 arranged in a circle on its end face. The pallet 20 has a conveyor block 26 having a recess 27. A workpiece (not shown) is fixed to the front face of the pallet 20.

The clamp unit 21 includes a shaft 30 horizontally carried by the bed 1 in such a manner that its one end projects through the front side 3 of the bed, and an index spindle 31 telescopically carried on the shaft 30 in such a manner that the spindle 31 and shaft 30 are capable of relative movement. The shaft 30 is provided with a clamp plate 32 of a rectangular shape at its projecting end portion. The shaft 30 is connected to a piston 34 of a hydraulic cylinder 33 at its opposite end. The hydraulic cylinder 33 is slidably carried on the bed 1 through a metal sleeve 35 in such a manner that it can rotate and slide axially.

The index spindle 31 has a bulged portion 31$a$ which is rotatively and slidably carried on a second hydraulic cylinder 37 through a metal sleeve 36, and is connected to the first hydraulic cylinder 33 through a flange 38 at the opposite end to the bulged portion 31$a$, to which an index plate 39 is fixed. The index plate 39 is provided with index teeth 40 on its inner side, and teeth 41 on its outer side, the teeth 41 being engageable with the teeth 25 on the pallet 20. There is provided a ring 43 connected to the front end of the hydraulic cylinder 37, the ring 43 having teeth 42 engageable with the index teeth 40.

The second hydraulic cylinder 37 has a hollow cylindrical piston 44 which is telescopically carried on the index spindle 31 through a metal 45 for relative rotation. The front end of the piston 44 is engaged with the bulged portion 31a through a thrust bearing 46, and the rear end thereof is engaged with a collar 48 secured to the index spindle 31 through a thrust bearing 47. The piston 44 is prevented by a pin or the like from rotation with respect to the second hydraulic cylinder 37. In this way the piston 44 and the index spindle 31 are relatively rotatable, but the piston 44 is prevented from its axial movement whereas the index spindle 31 is axially movable.

The index spindle 31 is rotated by a rotary gear 49 secured to the rear end of the first hydraulic cylinder 33 by the use of a suitable driving means.

As best shown in FIGS. 4 and 5, the pallet conveyor 22 includes guide plates 51 arranged at both sides of the clamp plate 32 and secured to the front face 3 of the bed 1, from which the plates extend horizontally. Guide brackets 52 are arranged under the guide plate 51 in parallel therewith, with the guide brackets being fixed to the front face 3 of the bed 1. A conveyor plate 53 is provided under the guide brackets 52 in parallel therewith in such a manner so as to be horizontally slidable. The guide plate 51 and the guide bracket 52 are provided with rollers 54, 55, and 56 in their lengthwise upper edges, the rollers 54 to 56 being spaced at given intervals. The pallet 20 horizontally moves under the guidance of the plate 51 and bracket 52 in its vertical posture, wherein the guide plate 51 fits in the groove 23. The movement of the pallet 20 is facilitated by the rollers 54, 55 and 56.

In operation, buffer stations 57 are provided at opposite sides of the front face 3 of the bed 1. A workpiece-loaded pallet 20' remaining at the left-hand buffer station 57 is conveyed under the guidance of the plate 51 and block 52 up to the clamping position where the pallet 20' comes into engagement with the clamp plate 32 of the unit 21. There are provided reversing devices (not shown) at the buffer stations 57 for changing the horizontal posture of the pallet 20 to its vertical posture, thereby enabling the workpiece to transfer automatically from the pallet 20' to the pallet 20. The conveyor plate 53 is slidably carried on a linear guide 58 through a bearing 59, the linear guide 58 being provided on the front face 3 of the bed 1. The conveyor plate 58 is provided with a rack 60 which engages a pinion 61 driven by a hydraulic motor 62. When the motor 62 is driven, the conveyor plate 58 is moved reciprocally through the pinion and the rack 60. There are pins 63 near the opposite ends of the conveyor plate 58, the pins being moved up and down in their vertical postures by a hydraulic cylinder 63. The space between the two pins 63 is arranged so that it is equal to the distance between the centers of the clamp unit 21 and the buffer station 57. There are provided stop pins 65 at either side of a support 66 for the hydraulic motor 62.

An example of the operation of the clamp unit 21 and the conveyor 22 will be described:

FIG. 4 shows a state in which the pallet 20 has been conveyed to the clamping position. In this way the pallet 20 is shifted from the guide plate 51 to the clamp plate 32 which fits in the groove 23 of the pallet 20, thereby enabling the pallet 20 to take its vertical posture as shown in FIG. 3.

Then the piston 34 of the hydraulic cylinder 33 is moved backward, thereby causing the clamp shaft 30 to move axially backward. In accordance with the backward movement of the clamp shaft 30 the pallet 20 is withdrawn toward the index plate 39 through the clamp plate 32, thereby enabling the teeth 25 to engage the teeth 41 of the index plate 39. At this stage the other teeth 40 of the index plate 39 are engaged with the teeth 42 of the ring 43. In this way the pallet 20 is secured to the hydraulic cylinder 37 fixed to the bed 1 through the ring 43. In this specification this state of the pallet 20 is called "the pallet is clamped". In this state the saddle 4, the column 6 and the headstock 9 are moved along the X, Y and Z axis, respectively. During the movement of the headstock 9 the tool (not shown) mounted on the main shaft 12 thereof cuts the workpiece (not shown).

When another side of the workpiece is to be cut by the tool, the piston 44 of the hydraulic cylinder 37 is caused to advance while the teeth 25 of the pallet 20 are kept in engagement with the teeth 41 of the index plate 39. As the piston 44 advances the index spindle 31 and the clamp shaft 30 protrude together, thereby disengaging the teeth 40 of the index plate 39 from the teeth 42 of the ring 43. In this state the drive is imparted to the index spindle 31 through the gear 49, thereby causing the index spindle 31 to rotate. As the spindle 31 rotates the pallet 20 rotates at a desired angle for indexing purpose. After the rotation is finished the piston 44 returns, and the index spindle also withdraws. In this way the teeth 40 of the index plate 39 come into engagement with the teeth 42, thereby restoring the clamping state. By repeating the clamping and indexing process the workpiece mounted on the pallet 20 is cut in its four faces.

After the cutting operation on the workpiece is finished the piston 33 of the hydraulic cylinder 33 is moved forward, thereby causing the clamp shaft 30 to advance. As the clamp shaft moves, the pallet 20 is pushed forward, thereby disengaging the teeth 25 from the teeth 41. In this way the clamping state is released into "unclamping" state. Then, the pins 64 rise and come into engagement with the recess 27 in the conveyor block 26 of the "unclamping" pallet 20. It also comes into engagement with the recess 27 in the conveyor block 26 of the other pallet 20' remaining at the left-hand buffer station 57 shown in FIG. 4. Then the conveyor plate 53 moves along the phantom line in FIG. 4, thereby enabling the pallet 20 holding the finished workpiece to transfer to the right-hand buffer station 57. At this stage the next pallet 20' comes to the clamping position. The same procedure will be repeated, during which the tools are exchanged, depending upon the workpiece and the types of process, by the automatic tool exchange device 14. In this way various types of processes are automatically applied to workpieces.

Figure 6:
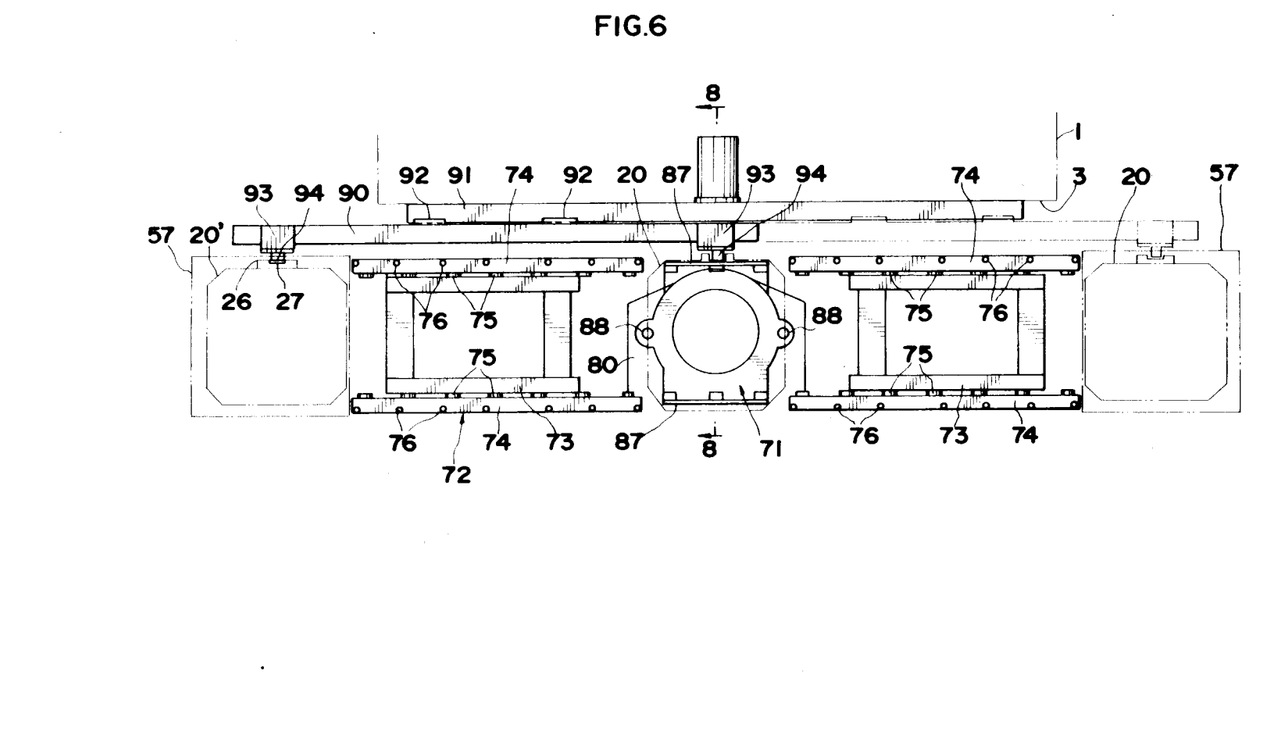
FIG. 6 is a plan view showing a modified version of the embodiment.
Figure 7:
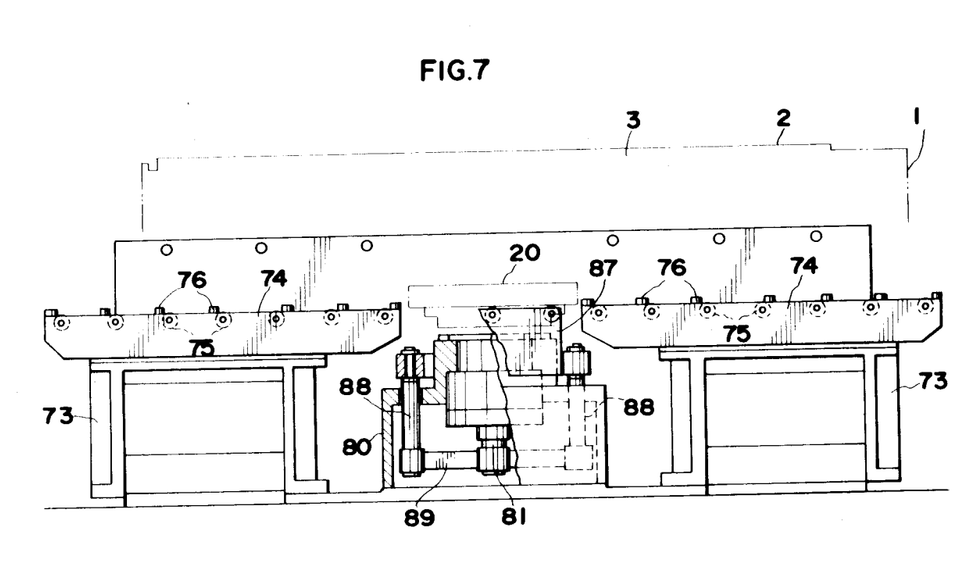
FIG. 7 is a front view of the modified version of FIG. 6.
Figure 8:
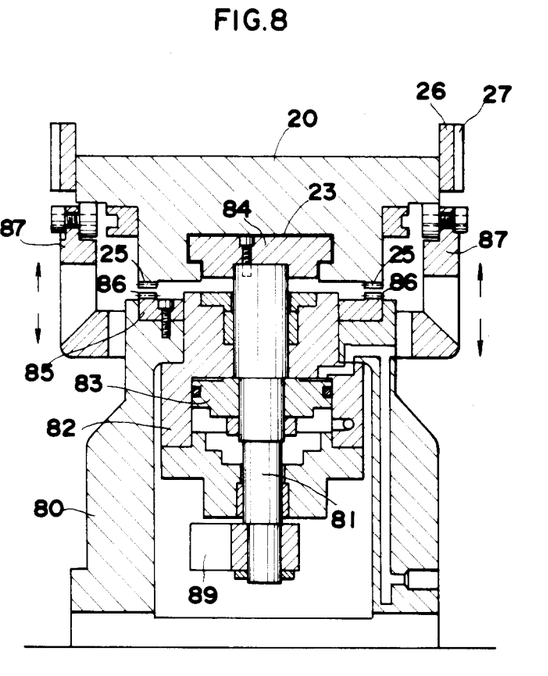
FIG. 8 is a cross-sectional view, on an enlarged scale, taken along the line 8—8 in FIG. 6.

FIGS. 6 to 8 show a clamp unit 71 and a conveyor 72, which are modified versions of those described above. These are characterized in that the pallet 20 is clamped and conveyed in its horizontal posture:

The clamp unit 71 is provided in front of the center of the front face 3 of the bed 1, and loaders 73 of the conveyors 72 are provided in parallel with the front face 3 of the bed at both sides of the clamp unit 71.

There are provided guide plates 74 at opposite sides of each loader 73 so as to convey the pallet 20 smoothly with the aid of rollers 75 and 76.

The clamp unit 71 has no indexing device, and, as shown in FIG. 8, the clamp shaft 81 is passed through a piston 83 of a hydraulic cylinder 82 secured to the clamp base 80, and is provided with a clamp plate 84 in its upper end section. The pallet 20 is kept horizontal by receiving the clamp plate 84 in its groove 23. The clamp base 80 is provided with a ring 85 on its top surface, the ring 85 including clamping teeth 86 engageable with the teeth 25 of the pallet 20. There are provided guide plates 87 for guiding the pallet 20 at its both sides. As shown in FIG. 7, the guide plate 87 is supported by two posts 88 fixed to the clamp base 80 in such a manner as to be vertically slidable. The lower ends of the posts 88 are connected to a lower end of a clamp shaft 81 through an arm 89. When the piston 83 of the hydraulic cylinder 82 is operated to move the clamp shaft 81 downward, the pallet 20 also moves downward to the clamping position. In accordance with the descent of the pallet 20 the guide plates 87 follow it. Thus the teeth 25 come into engagement with the teeth 85, thereby clamping the pallet 20. When the clamp shaft 81 rises toward the clamping state, the guide plates 87 ascend and support the pallet 20 in the "unclamping" state at its both ends. In this way the pallet 20 is ready to convey.

There is provided a conveyor plate 90 slidably fixed to the front face 3 of the bed 1 through bearins 92, with the guide plate 91 being interposed. The conveyor plate 90 is provided with pins 94 at its opposite ends, the pins 94 being operable by hydraulic cylinders 93. The pins 94 are intended for engagement with the recesses 27 in the respective conveyor blocks 26 of the pallet 20 at the clamping position and the pallet 20' remaining at the buffer station 57. Thus, the two pallets 20, 20' are simultaneously moved in the same manner as described above.

Figure 9A:
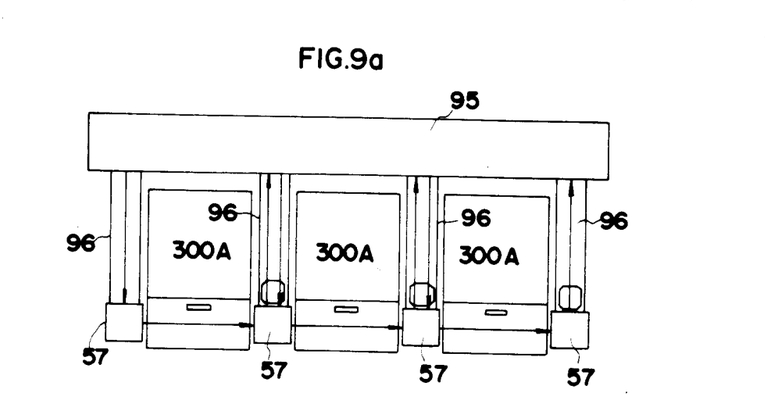

FIGS. 9(a), (b) and (c) show a state in which several machining ceners of the present invention are systematized, which is commonly called "flexible manufacturing system or merely FMS". The reference numeral 300A and 300B denote the model illustrated in FIGS. 1 to 5, and the model illustrated in FIGS. 6 to 8, respectively. There are provided a pallet pool 95 and a pallet loader 96 for connecting the pallet pool 95 to the buffer station 57.

Figure 9B:
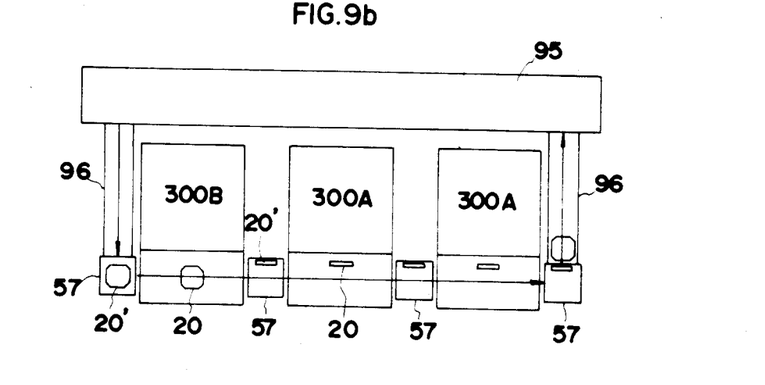
Figure 9C:
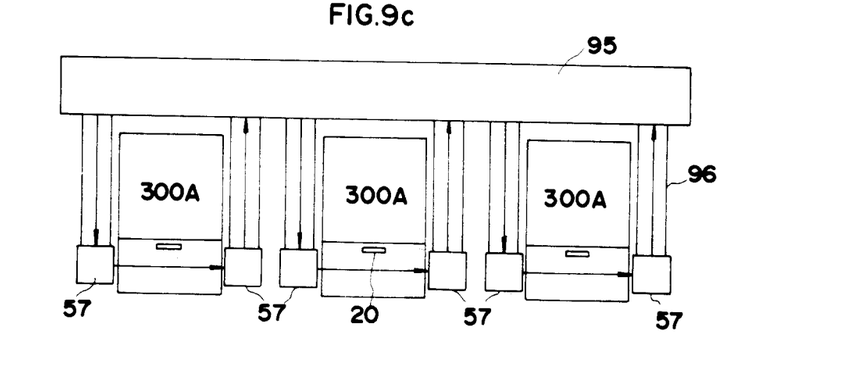

As is evident from FIGS. 9(a) to 9(c) the machining centers of the invention can be readily systematized to provide a simplified production line so as to increase versatility, that is, under this system it is possible to process workpieces as desired on the line. The embodiment shown in FIG. 9(b) consists of a combination of different models of centers 300A and 300B. Under this embodiment the workpiece can be processed in its five faces without dismounting it from the pallet.

What is claimed is:

1. A vertical machining center comprising:
   a bed including a substantially vertically extending front face;
   a pallet clamp unit and a pallet conveyor unit arranged along the front face of the bed;
   a saddle provided on an upper surface of the bed, the saddle being slidable along an X axis;
   a column provided on a top surface of the saddle, the column being slidable along a Y axis;
   a headstock provided on a front face of the column, the headstock being vertically slidable;
   a tool magazine and an automatic tool exchange device, both being arranged alongside the bed; and
   a numerical control unit for numerically controlling the saddle, the column, the headstsock, the pallet clamp unit, the pallet conveyor, the tool magazine and the automatic tool exchange device.

2. A vertical machining center as defined in claim 1, wherein the pallet clamp unit and the conveyor support the pallet in its vertical posture along the front face of the bed so that the pallet is clamped and conveyed in the vertical posture, and wherein the clamp unit is rotatable around the clamp shaft so as to effect the indexing of the workpiece.

3. A vertical machining center as defined in claim 1, wherein the pallet clamp unit and the conveyor support the pallet in its horizontal posture along the front face of the bed so that the pallet is clamped and conveyed in the horizontal posture.

4. A vertical machining center as defined in claim 1, wherein the headstock includes a built-in motor for driving the main shaft.

* * * * *